US011430059B2

(12) United States Patent
Sundaram et al.

(10) Patent No.: US 11,430,059 B2
(45) Date of Patent: Aug. 30, 2022

(54) MULTI-LENDER PLATFORM THAT SECURELY STORES PROPRIETARY INFORMATION FOR PRE-QUALIFYING AN APPLICANT

(71) Applicant: Capital One Services, LLC, McLean, VA (US)

(72) Inventors: Dinesh Sundaram, Plano, TX (US); Rajaboopathy Vijayaraghavan, Carrollton, TX (US); Sanjiv Yajnik, Dallas, TX (US); Raman Bajaj, Frisco, TX (US); Jacques Morel, Colleyville, TX (US); Trent Jones, Mckinney, TX (US); Thomas Sickert, Plano, TX (US); Jacob Creech, Mckinney, TX (US); Alan Ilango, Mckinney, TX (US); Alex Baird, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/881,897

(22) Filed: May 22, 2020

(65) Prior Publication Data
US 2020/0372574 A1 Nov. 26, 2020

Related U.S. Application Data

(60) Provisional application No. 62/852,202, filed on May 23, 2019.

(51) Int. Cl.
*G06Q 40/02* (2012.01)
*G06Q 30/02* (2012.01)
(Continued)

(52) U.S. Cl.
CPC ....... *G06Q 40/025* (2013.01); *G06F 9/44505* (2013.01); *G06F 9/54* (2013.01);
(Continued)

(58) Field of Classification Search
CPC ...... G06Q 40/00; G06Q 40/02; G06Q 40/025; G06Q 30/02; G06Q 30/06; G06Q 10/10
(Continued)

(56) References Cited

U.S. PATENT DOCUMENTS 7,461,080 B1* 12/2008 Tucker ................ G06F 11/3476
7,620,597 B2* 11/2009 Eze ...................... G06Q 40/025
705/38

(Continued)

FOREIGN PATENT DOCUMENTS

WO WO-2015136503 A1 * 9/2015 ............. G06Q 40/06

*Primary Examiner* — Kelly S. Campen
(74) *Attorney, Agent, or Firm* — Sterne, Kessler, Goldstein & Fox P.L.L.C.

(57) ABSTRACT

The system and methods described herein allow users to apply for a purchase of a good from multiple providers using provider specific methodologies for generating offers for the product. For example, the system described herein may include a multi-layer architecture that includes interactive micro-services that communicate together in a bi-directional manner to create a normalized process for the purchase of a good, such as commercial goods/products (e.g. a vehicle) or real property. The micro-services may assess prequalification for a loan or financing for a good, followed by determining eligibility of the good for financing, and further followed by calculating pricing details for loans (e.g. for financing purchase of the good) that would be offered for a consumer's particular financial credentials, for each of a plurality of lenders. Prequalification and pricing may be performed on a good by good basis, or for a plurality of goods near or substantially simultaneously.

20 Claims, 6 Drawing Sheets

(51) Int. Cl.

| | |
|---|---|
| *G06F 16/955* | (2019.01) |
| *H04L 9/40* | (2022.01) |
| *G06N 20/00* | (2019.01) |
| *G06F 9/54* | (2006.01) |
| *G06F 21/60* | (2013.01) |
| *G06K 9/62* | (2022.01) |
| *G06N 3/02* | (2006.01) |
| *G06F 9/445* | (2018.01) |
| *H04L 67/01* | (2022.01) |
| *G06F 16/25* | (2019.01) |
| *G06F 21/62* | (2013.01) |
| *H04L 9/08* | (2006.01) |
| *G06Q 20/40* | (2012.01) |
| *G06Q 30/00* | (2012.01) |
| *G06Q 30/06* | (2012.01) |
| *G06F 40/103* | (2020.01) |
| *G06F 40/174* | (2020.01) |
| *G06F 40/18* | (2020.01) |
| *G06Q 10/10* | (2012.01) |
| *G06F 21/53* | (2013.01) |
| *G06N 5/02* | (2006.01) |
| *G06Q 20/38* | (2012.01) |
| *G06F 8/65* | (2018.01) |
| *G06F 8/71* | (2018.01) |
| *G06K 7/14* | (2006.01) |
| *G06Q 50/26* | (2012.01) |

(52) U.S. Cl.
CPC ............ *G06F 9/547* (2013.01); *G06F 16/258* (2019.01); *G06F 16/9558* (2019.01); *G06F 16/9562* (2019.01); *G06F 21/53* (2013.01); *G06F 21/602* (2013.01); *G06F 21/6227* (2013.01); *G06F 21/6245* (2013.01); *G06F 40/103* (2020.01); *G06F 40/174* (2020.01); *G06F 40/18* (2020.01); *G06K 9/6267* (2013.01); *G06N 3/02* (2013.01); *G06N 5/025* (2013.01); *G06N 20/00* (2019.01); *G06Q 10/10* (2013.01); *G06Q 20/382* (2013.01); *G06Q 20/4014* (2013.01); *G06Q 30/0185* (2013.01); *G06Q 30/0206* (2013.01); *G06Q 30/0601* (2013.01); *G06Q 30/0613* (2013.01); *G06Q 30/0619* (2013.01); *G06Q 30/0637* (2013.01); *G06Q 30/0643* (2013.01); *G06Q 40/02* (2013.01); *H04L 9/0825* (2013.01); *H04L 63/0435* (2013.01); *H04L 63/08* (2013.01); *H04L 63/0815* (2013.01); *H04L 63/102* (2013.01); *H04L 63/123* (2013.01); *H04L 63/166* (2013.01); *H04L 63/168* (2013.01); *H04L 67/42* (2013.01); *G06F 8/65* (2013.01); *G06F 8/71* (2013.01); *G06F 2221/2107* (2013.01); *G06K 7/1417* (2013.01); *G06Q 50/265* (2013.01); *G06Q 2220/00* (2013.01); *H04L 9/0822* (2013.01)

(58) Field of Classification Search
USPC ........................................ 705/35, 38, 39, 1.1
See application file for complete search history.

(56) References Cited

U.S. PATENT DOCUMENTS

| | | | |
|---|---|---|---|
| 7,630,933 B2* | 12/2009 | Peterson | G06Q 40/025 |
| | | | 705/38 |
| 7,908,210 B2 | 3/2011 | Huber et al. | |
| 8,392,294 B2 | 3/2013 | MacInnis | |
| 8,909,551 B2 | 12/2014 | Pawlusiak et al. | |
| 10,033,702 B2 | 7/2018 | Ford et al. | |
| 10,210,570 B2 | 2/2019 | Bennett et al. | |
| 10,243,743 B1 | 3/2019 | Madisetti et al. | |
| 2005/0187860 A1* | 8/2005 | Peterson | G06Q 40/02 |
| | | | 705/38 |
| 2006/0178983 A1 | 8/2006 | Nice et al. | |
| 2007/0244808 A1* | 10/2007 | Eze | G06Q 40/025 |
| | | | 705/38 |
| 2010/0023448 A1* | 1/2010 | Eze | G06Q 40/02 |
| | | | 705/38 |
| 2011/0112946 A1* | 5/2011 | Porter | H04L 63/102 |
| | | | 705/35 |
| 2011/0270659 A1 | 11/2011 | Crites | |
| 2011/0313884 A1* | 12/2011 | Eze | G06Q 30/0613 |
| | | | 705/26.41 |
| 2013/0218752 A1* | 8/2013 | Pawlusiak | G06Q 40/025 |
| | | | 705/38 |
| 2014/0020068 A1 | 1/2014 | Desai et al. | |
| 2014/0279399 A1* | 9/2014 | Shidler | G06Q 40/025 |
| | | | 705/38 |
| 2015/0170233 A1* | 6/2015 | Lisitsa | H05K 7/20309 |
| | | | 705/26.1 |
| 2016/0042451 A1* | 2/2016 | Raessler | G06Q 40/025 |
| | | | 705/38 |
| 2016/0050272 A1 | 2/2016 | Raduchel | |
| 2016/0232546 A1 | 8/2016 | Ranft et al. | |
| 2016/0350850 A1 | 12/2016 | Shields et al. | |
| 2018/0040064 A1 | 2/2018 | Grigg et al. | |
| 2018/0041338 A1* | 2/2018 | Nighswander | G06F 21/6209 |
| 2018/0158139 A1 | 6/2018 | Krajicek et al. | |
| 2019/0102836 A1 | 4/2019 | Wales et al. | |
| 2019/0114705 A1 | 4/2019 | Wong et al. | |
| 2019/0130480 A1 | 5/2019 | Brewbacker et al. | |
| 2019/0333142 A1 | 10/2019 | Thomas | |
| 2020/0043066 A1 | 2/2020 | Obaidi | |
| 2020/0311808 A1 | 10/2020 | Srivastava et al. | |

\* cited by examiner

Overview

MULTI-LENDER PLATFORM THAT SECURELY STORES PROPRIETARY INFORMATION FOR PRE-QUALIFYING AN APPLICANT

CROSS-REFERENCE TO RELATED APPLICATIONS AND INCORPORATION BY REFERENCE

The following application is incorporated herein by reference in its entirety: U.S. provisional application 62/852,202, filed May 23, 2019, and entitled "Multi-Lender Platform."

BACKGROUND

Most vehicle purchases involve financing, which increases the total cost of the vehicle, because in addition to the price of the vehicle, the consumer is paying for the cost of credit (interest and ancillary costs). In making such a purchase, the consumer has an incentive to minimize these additional costs. Typically, consumers obtain automobile financing for the purchase of a vehicle of interest upon visiting a dealer. At such a visit, dealers often run credit checks on the consumer to check the consumer's credit in deciding to offer a loan application. If the consumer does not end up buying the vehicle, his or her credit score may be affected, and may drop a consumer's score by several points, remaining on the consumer's credit reports for several years. Furthermore, having auto loan inquiries but no auto loan on the consumer's credit may make it appear as if the consumer has been turned down for the loan, and may affect future mortgage applications. Additionally, consumers submit separate inquiries with each dealer, which may further adversely affect their credit worthiness in the future. Alternatively, in the event that the consumer does end up buying the vehicle from a dealer with financing, the consumer still faces several hurdles in optimally financing his or her vehicle. Further, even if the consumer is approved for a bank loan, communications are often not integrated with a third-party lender. That is, the consumer faces the added inconvenience of having to communicate with two separate parties to complete the purchase of the vehicle, i.e., the dealer and the lender.

Due to a lack of security, current platforms do not include an integrated system that enables dealers to communicate with multiple lenders simultaneously and that applies propriety information of each lender to simultaneously pre-qualify applicants, determine product eligibility, and determine product pricing.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
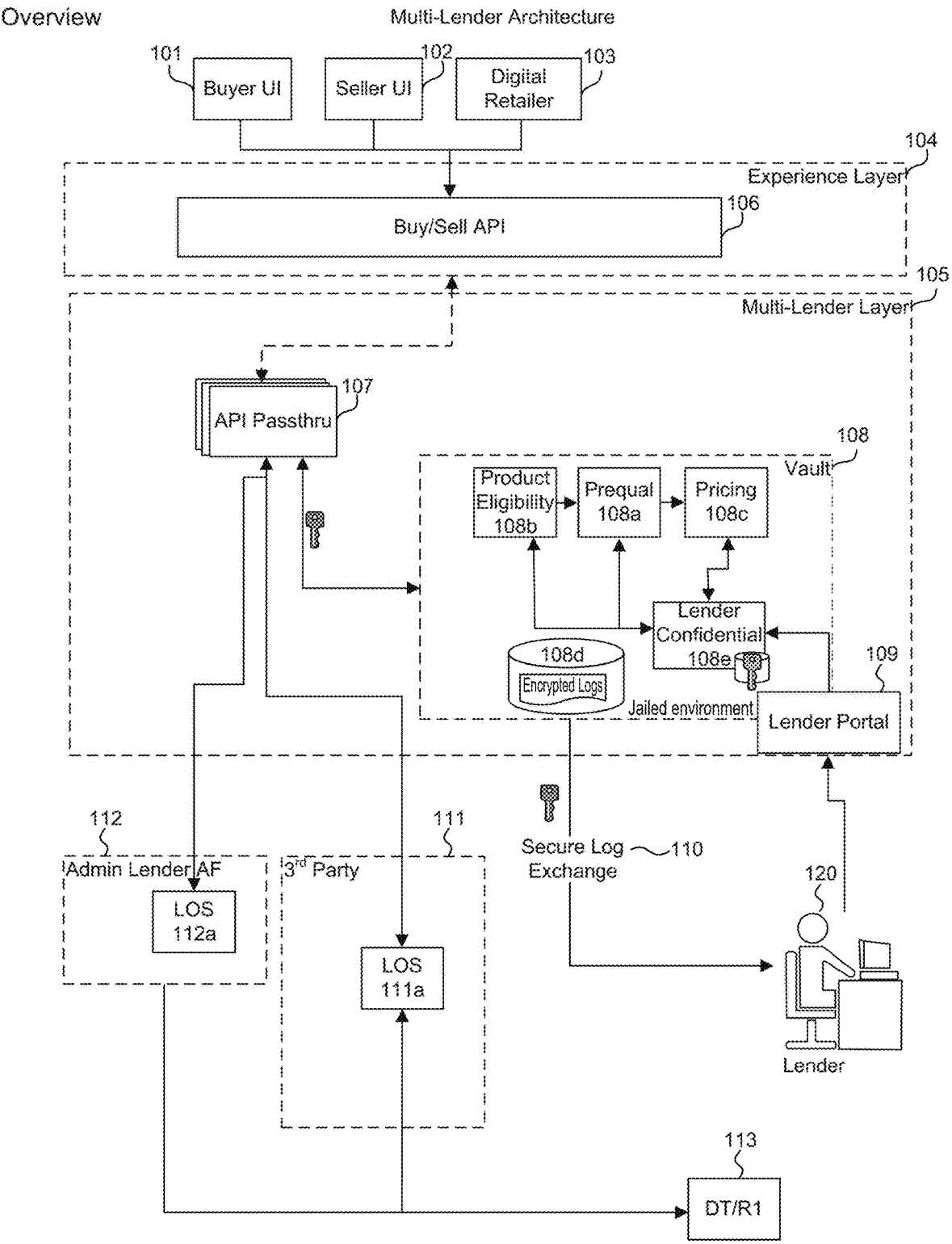
FIG. 1 is a block diagram of a multi-lender platform architecture according to an embodiment.

Provided herein are system, apparatus, device, method and/or computer program product embodiments, and/or combinations and sub-combinations thereof, for utilizing a multi-lender architecture.

It is to be appreciated that the Detailed Description section, and not the Summary and Abstract sections, is intended to be used to interpret the claims. The Summary and Abstract sections may set forth one or more but not all exemplary embodiments contemplated by the inventor(s), and thus, are not intended to limit the present embodiments and the appended claims in any way.

The system described herein provides a secure unified system for users to apply for a purchase of a good from multiple providers using provider specific methodologies for generating offers for the product. For example, the system described herein may include a multi-layer architecture that includes interactive micro-services that communicate together in a bi-directional manner to create a normalized process for the purchase of a good, such as commercial goods/products (e.g. a vehicle) or real property. The micro-services may assess prequalification for a loan or financing for a good, followed by determining eligibility of the good for financing, and further followed by calculating pricing details for loans (e.g. for financing purchase of the good) that would be offered for a consumer's particular financial credentials, for each of a plurality of lenders. Prequalification and pricing may be performed on a good by good basis, or for a plurality of goods near or substantially simultaneously. The multi-layer architecture may include multiple layers such as an experience layer and a multi-lender layer. The experience layer may include an API to facilitate communication between clients and the multi-lender layer. The experience layer may include data repositories for storing information associated with, prequalification, loan offers, and marketplace information. The multi-lender layer may include the micro-services described herein. Lenders can upload their methodologies for generating automobile loan offers to a self-contained jailed environment in the multi-lender architecture. A user can submit an application for an automobile loan and the described system may process the loan application for each lender that has uploaded their methodology to the self-contained jailed environment. The loan offers can be generated for each lender, in parallel, using a methodology specific to each lender.

The system of the present disclosure provides a technical advantage over conventional systems because this configuration is able to generate multiple loan offers from various lenders in parallel using each lender's proprietary information while maintaining a secure jailed environment restricting access or visibility to the lenders' proprietary information. For example, the system described herein includes a lender portal, through which, lenders can provide propriety information use to prequalify applicants, determine product eligibility, and determine product pricing. The system stores such propriety information in the secure jailed environment, such that lenders and/or users may not access or view other lenders' proprietary information for building a loan offer. In some embodiments, the system described herein provides an end-to-end intermediating architecture, tailoring consumer-specific credentials to be submitted against custom lender-specific requirements and assessing the result within the architecture, guiding both parties through the steps of pre-qualification, goods/property eligibility, goods/property pricing, and finally the linking of a resulting credit application for the purchase of said goods or property. Example processes and systems for using the jailed environment are described in U.S. patent application Ser. No. 16/882,163, titled, "JAILED ENVIRONMENT RESTRICTING PROGRAMMATIC ACCESS TO MULTI-TENANT DATA," filed concurrently herewith, which is incorporated herein by reference in their entirety.

Figure 2:
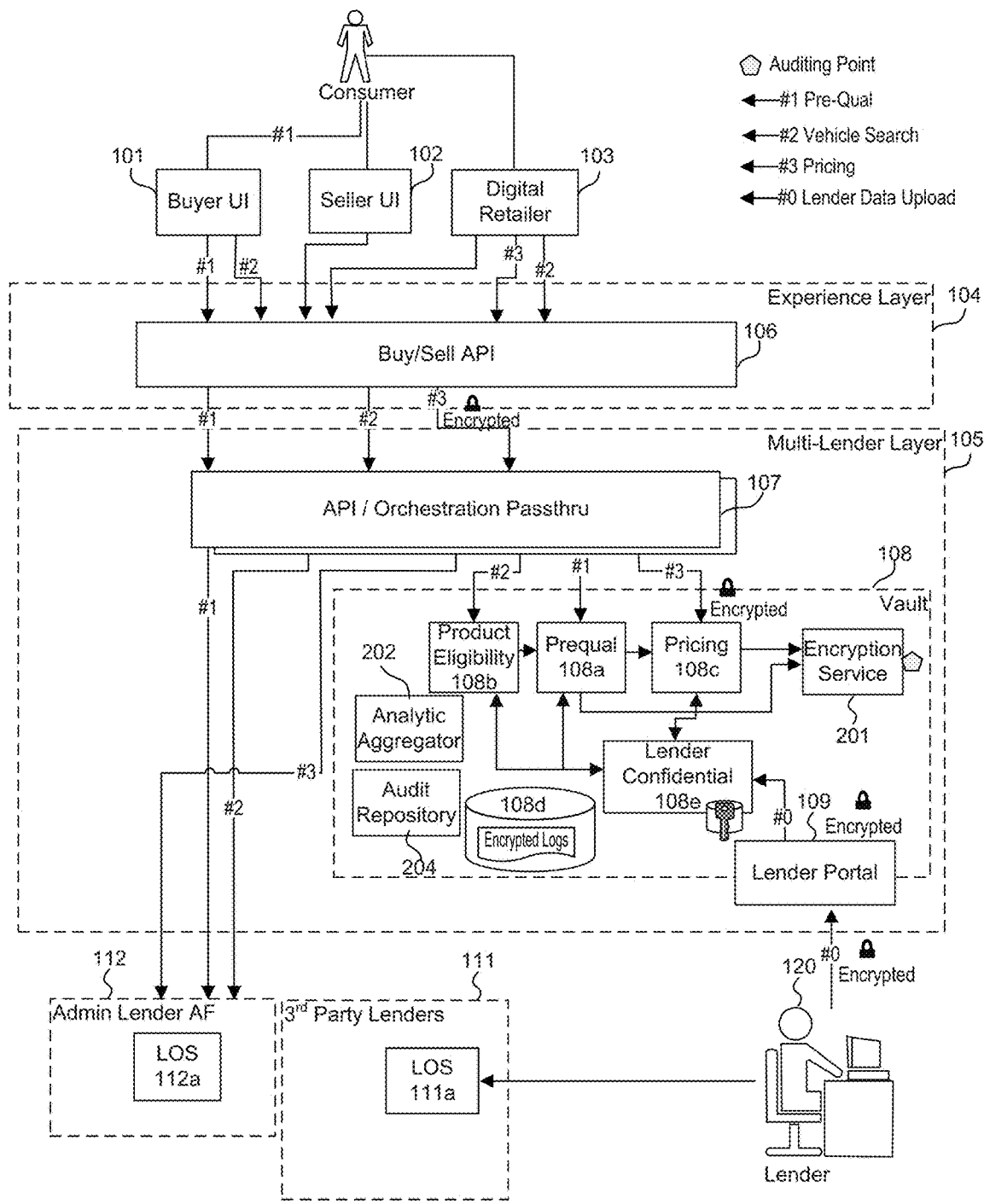
FIG. 2 is a diagram of an example data flow of the multi-lender platform for a given lender according to an embodiment.

FIGS. 1-2 are block diagrams illustrating the multi-lender architecture 100 according to an embodiment. FIGS. 1-2 will be described herein concurrently. In some embodiments, the multi-lender architecture may include a plurality of interactive micro-services that communicate with one another in a bi-directional manner to create a normalized process for purchasing a product, such as a vehicle. The normalized process may include prequalifying one or more applicants for a loan with a plurality of lenders to purchase the product and calculating pricing details for each loan that would be offered by each lender based on an applicant's credentials. In some aspects, the pricing may be for a specific vehicle selected by the applicant or across a range of vehicles available in an inventory.

As illustrated in FIGS. 1 and 2, the multi-lender architecture may include an experience layer 104 and a multi-lender layer 105. In some embodiments, the experience layer 104 may be accessed via numerous user interfaces (UIs), which may be executed on a client device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. For example, the UIs may include buyer UI 101, seller UI 102, and/or digital retailer UI 103 which may be embodied as client applications. In some embodiments, a customer may use a personal client device to log in using the buyer UI 101 or the digital retailer UI 103. Similarly, a dealer or digital retailer may use a client device to log in using the seller UI 102 or the digital retailer UI 103.

In some embodiments, the experience layer 104 may be accessed through the Buy/Sell API 106 using any one of the UIs 101-103. For example, after logging in to the multi-lender architecture using one of the UIs 101-103, the customer or the dealer may interact with the multi-lender architecture via the experience layer 104 via a Buy/Sell application programming interface (API) 106. In some embodiments, the experience layer 104 may display information to the customer, dealer, or digital retailer in a lender agnostic format. That is, information may be displayed to the customer, dealer, or digital retailer on the client device in a universal, applicant-friendly format using the experience layer 104. For example, the information may include application forms, prequalification results from lenders, pricing on eligible vehicles for purchase, or the like. In some embodiments, the experience layer 104 may communicate with the multi-lender layer 105. For example, an API Passthru 107 of the multi-lender layer 105 may communicate with the Buy/Sell API 106 of the experience layer 104. Thus, the Buy/Sell API 106 may enable communication between the buyer UI 101, seller UI 102, and/or digital retailer UI 103 and the multi-lender layer 105.

In some embodiments, the buyer UI 101 may be a client application configured to search for products and procure pricing information for a loan from various lenders, executing on a customer's device. The seller UI 102 may be an application configured to search for products and procuring pricing information for a loan from various lenders, executing on a seller's device. The loan can be an automobile loan, a mortgage, unsecured personal loans, secured personal loans, debt consolidation loans, variable-interest loans, or the like. The product for sale can be a house, car, motorcycle, recreational vehicle (RV), aircraft, boat, and/or the like. In some embodiments, a digital retailer UI 103 (i.e., a third-party system) may be embodied as a web domain associated with a retailer such as an automobile dealership. The digital retailer UI 103 may render a hyperlink. The digital retailer UI 103 may interface with the multi-lender layer 105 using the hyperlink. A user may actuate the hyperlink to initiate a request for a prequalification for a loan to purchase an automobile sold by the automobile dealership associated with the digital retailer UI 103. In response to actuating the hyperlink, the user may be prompted to input personal information associated the user, on the digital retailer UI 103 site. The user may submit the personal information associated with the user through the digital retailer UI 103. The personal information associated with the user may be encrypted and transmitted to the multi-lender layer, via the Buy/Sell API 106. In some embodiments, the personal information can be transmitted securely over HTTPS, unencrypted to the multi-lender layer 105, via the Buy/Sell API 106. In some embodiments, portions of the personal information such as a social security number may be encrypted.

Figure 5:
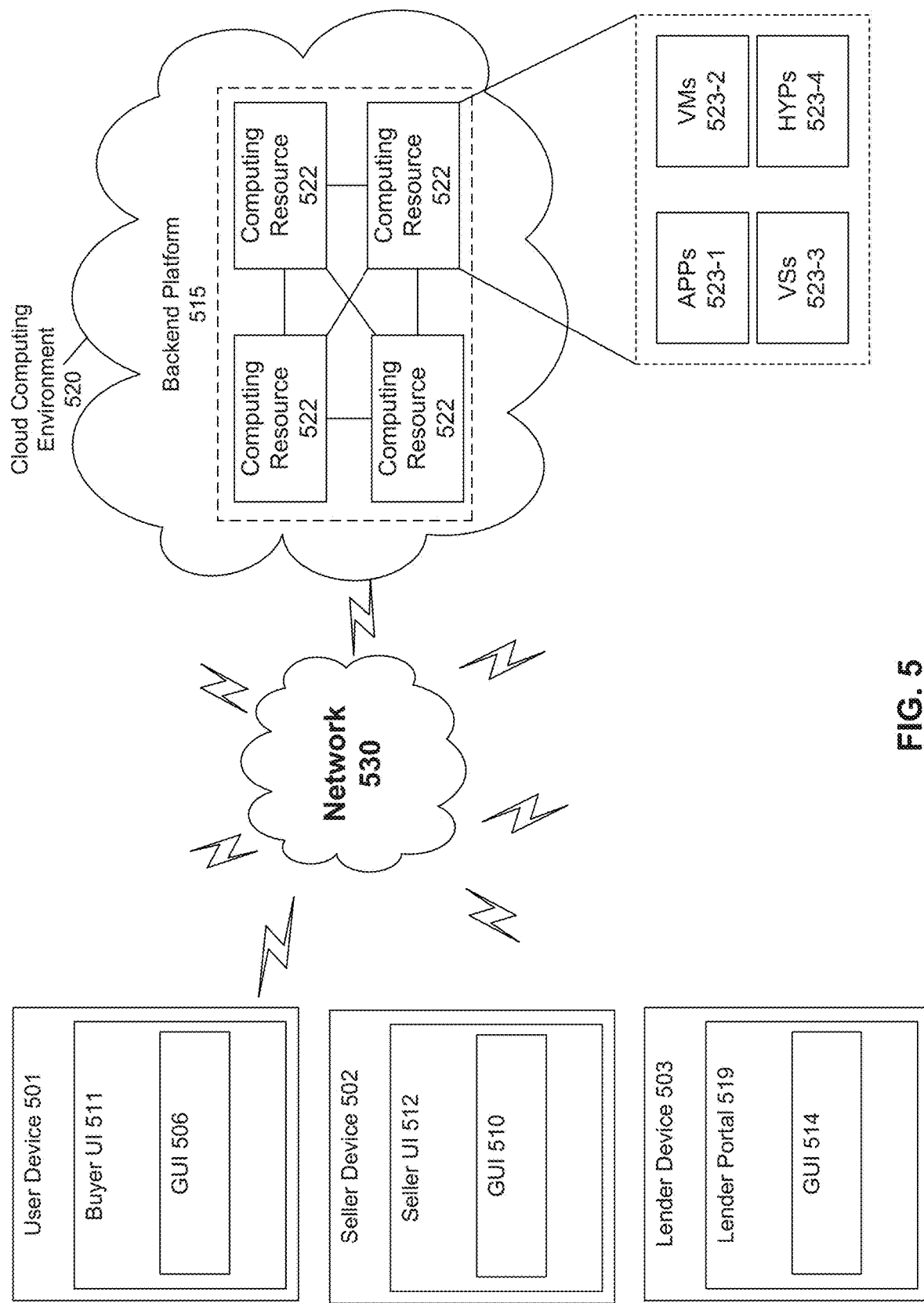
FIG. 5 is a block diagram of an example network environment.

As an example, one or more applicants may use the buyer UI 101, the seller UI 102, and/or the digital retailer UI 103 to obtain pricing information for a loan for an automobile. While the one or more applicants may use any one of the UIs 101-103 to obtain pricing information, the examples discussed herein will be made with reference to the buyer UI 101, as the seller UI 102 and the digital retailer UI 103 operate in a similar manner. For example, the buyer UI 101 or seller UI 102 may each render different graphical user interfaces (GUIs) 506, 510, respectively, as shown in FIG. 5.

In some embodiments, the buyer UI 101 may render different graphical user interfaces (GUIs) configured to receive input from the user which may be transmitted to the multi-lender layer 105 for further processing to obtain pricing information for a loan for an automobile. The input information may be transmitted to the multi-lender layer 105 through the Buy/Sell API 106. Information may be communicated from the multi-lender layer 105 back to the buyer UI 101 to be rendered the respective GUI.

In some embodiments, the multi-lender architecture may be associated with a financial institution (e.g., bank or lender), which may provide its own lending platform 112. The lending platform 112 may include a loan origination system 112a. In some embodiments, the UIs 101-103 may communicate back and forth with the loan origination system 112a to generate a loan offer from the financial institution via the Buy/Sell API 106 and the API Passthru 107. In some embodiments, the lending platform 112 may receive rule sets for prequalifying an applicant from the financial institution, determine product eligibility, and determine a pricing for the product. In some embodiments, the UIs 101-103 may communicate with the loan origination system 112a to generate a loan offer from the financial institution, in parallel, with a vault 108, as discussed below. The loan offers from the lending platform 112 may be presented alongside the loan offers from the other lenders on the UIs 101-103.

In some embodiments, the multi-lender architecture may include a third-party API 111 including a third-party loan origination system 111a. In the case a lender does not upload to the multi-lender architecture, information associated with pre-qualification, vehicle eligibility, and pricing, the third-party loan origination system 111a may generate a loan offer for the lender. The third-party loan origination system 111a may communicate with the UIs 101-103 via the Buy/Sell API 106 and the API Passthru 107 to generate a loan offer, in parallel, with the micro-processes (e.g., pre-qualification micro-service 108a, product eligibility micro-service 108b, and pricing micro-service 108c). The loan offers from the third-party API may be presented alongside the loan offers from the other lenders on the UIs 101-103.

In some embodiments, the multi-lender layer 105 may include the API Passthru 107 and the vault 108. The API Passthru 107 may be an API Gateway and may also be responsible for request routing, composition, and protocol translation. As shown in FIG. 1, the vault 108 may include micro-processes, such as a prequalification micro-service 108a, a product eligibility micro-service 108b, and a pricing micro-service 108c. The micro-services 108a-108c may also be embodied as services, applications, modules, and/or the like. The vault 108 may also include an encrypted log (e.g., a data repository) 108d and a lender confidential repository 108e. It should be understood by those of ordinary skill in the arts that these micro-services and repositories are merely examples, and that the multi-lender architecture may include other micro-services and repositories in accordance with aspects of the present disclosure.

In some embodiments, the vault 108 may be accessed by a plurality of lenders 120 (only one shown in FIG. 1) using a lender portal 109 to provide information for prequalifying an applicant, determining vehicle eligibility for financing, and determining pricing information for each eligible vehicle. Example processes and systems for using the lender portal are described in U.S. patent application Ser. No. 16/881,860, titled, "SELF-SERVICE LENDER PORTAL," filed concurrently herewith, which is incorporated herein by reference in their entirety.

The information may include rules, algorithms, equations, restrictions, and/or the like, which govern the process of offering users loans for automobiles at determined prices. For example, the information may be provided via the lender portal in the form of rule sets and executable instructions which may be stored in the lender confidential repository 108e, which in turn may be a data structure stored on a non-transitory computer readable-media. In some embodiments, the lender information may be in the form of simple commands, which may translated into machine-level code by an interface application within the lender portal 109, such as choosing the type of criteria from drop-down lists and combining them with Boolean operators. In some embodiments, the lender 120 may be able to write their own shell code and/or scripts in languages such as the Python scripting language, JAVA, SQL, C, MATLAB etc., which may be able to operate using machine learning and/or Boolean logic as described herein on the user information securely, in an autonomous manner, within the vault 108. In some embodiments, the information may be received and stored in an encrypted format. Alternatively, the information may be received in an encrypted format, and the vault 108 may decrypt the information using the encryption service 201 and store the information in a decrypted format. In some embodiments, the lender portal 109 may be a cloud-based portal, through which, the lenders 120 may access the multi-lender layer 105. In some embodiments, the lenders 120 may modify the information for prequalifying an applicant, determine vehicle eligibility for financing, and determine pricing information for each eligible vehicle at any time via the lender portal 109. Furthermore, in some instances, the information for prequalifying an applicant, determining vehicle eligibility for financing, and determining pricing information for each eligible vehicle may be a large quantity of information, such that the lender 120 may transfer the information to the vault 108 using a bulk submission format via a managed file transfer protocol, as should be understood by those of ordinary skill in the art.

The vault 108 may process the prequalification, vehicle eligibility, and pricing information associated with building a loan offer for multiple lenders, in parallel, using proprietary information provided by each lender. Additionally, as the vault processes the information for multiple lenders 120, the loan origination system 112a and/or third-party loan origination system 111a may simultaneously process the loan application. In this way, the multi-lender architecture may assess applicant eligibility and vehicle eligibility, as well as pricing for eligible vehicles (e.g., personalized interest rates and monthly payments), for any number of lenders in parallel. As described above, the vault 108 may be a jailed environment, such that, while the lenders 120 may provide their proprietary information for building a loan offer to be stored in the vault 108, the lenders or users may not access or view other lenders' proprietary information for building a loan offer. This configuration provides a technical advantage over conventional systems because this configuration is able to generate multiple loan offers from various lenders in parallel using each lender's proprietary information while maintaining a secure jailed environment restricting access or visibility to the lenders' proprietary information.

In some embodiments, each lender 120 may interface with the lender portal 109 to upload and/or communicate information associated with their prequalification criteria, vehicle eligibility criteria, pricing, products offered (e.g., loans, warranties, GAP coverage, etc.), a list of partnered dealerships, including dealership name, dealership identification (e.g., an identification for third parties that interface between dealers and financial institutions (e.g., DealerTrack and/or RouteOne, DT/R1 113), or any other dealership identification), and dealership address, a list of potential counteroffers, a list of potential stipulations, and lender information (e.g., names, logos, hours of operation, business contact information, and/or business footprint (i.e., national, regional, or local) to the vault 108. By requiring that each lender provide such information, the multi-lender architecture enables a consistent experience for each applicant when building an offer and setting expectations for dealer interactions, ensures each applicant is directed to eligible lenders based on lender—dealer relationships, ensures a consistent experience for each applicant when generating an offer, ensures accurate lender information is displayed in the applicant experience, and ensures each applicant is directed to eligible lenders based on lender criteria.

The information associated with the prequalification criteria, vehicle eligibility criteria, and pricing may include rules, algorithms, equations, restrictions, and/or the like, which govern the process of prequalifying applications for loans, determining vehicle eligibility for the loans, and offering pricing for eligible vehicles. The information may be stored in the lender confidential repository 108e. In some embodiments, the information received from each lender 120 may be received in an unencrypted manner and stored in the vault 108. Alternatively, the information received from each lender 120 may be encrypted, and the vault 108 may decrypt the information and store the information in a decrypted format. As a result, the criteria stored for each lender 120 is stored and applied for application processing in an unencrypted format.

For example, using the portal 109, each lender 120 may provide criteria for prequalifying applicants, determining vehicle eligibility, and determining vehicle pricing that is securely stored in the lender confidential repository 108e, such that each lender 120 may have exclusive access to its criteria. For example, as lenders 120 upload proprietary information into the vault 108, the vault 108 may provide a secure environment in which the proprietary information may not be visible to anyone else (including the administrator of the multi-lender architecture) other than the lender. In this self-contained environment, lenders 120 may manage their own separate accounts. That is, each lender 120 is able to securely manage its loan eligibility criteria, rules, filing policies, and/or the like. Lenders 120 may view their own data inside the vault 108 and may not view data associated with other lenders 120. Furthermore, in some embodiments, the data associated with the lenders 120 may not be visible to users through the buyer UI 101, seller UI 102, or digital retailer UI 103, or any other interface. In some embodiments, vault 108 may be a multi-tenant environment, such that different lenders 102 can interface with the vault 108 to provide their proprietary information. For example, the administrator of the vault 108 may integrate the vault 108 with cloud computing service of a third-party entity to host the vault 108.

The vault 108 may process the criteria to generate a loan offer for multiple lenders, in parallel, using the proprietary criteria provided by each lender 1320. The multi-lender architecture may store these criteria in the lender confidential repository 108e. At any time, each lender 120 may access their respective criteria to modify or update the criteria via the lender portal 109. However, each lender 120 may access only their respective proprietary criteria, such that the proprietary criteria of each lender 120 is protected from other lenders. In this way, the vault 108 ensures that each lender's proprietary information cannot be discovered or reverse engineered by another lender to determine the underlying criteria. That is, the multi-lender architecture provides a technical advantage over conventional systems because the multi-lender architecture may generate multiple loan offers from multiple lenders in parallel using each lender's proprietary criteria while maintaining a secure jailed environment restricting access or visibility to the lenders' proprietary criteria. In some embodiments, the prequalification criteria may be related to the user, the vehicle, or both. For example, with respect to the user, the prequalification criteria may include, but is not limited to, financial requirements (e.g., escalating salary thresholds based on the price of a vehicle), employment requirements (e.g., being employed for a minimum period of time), credit worthiness (e.g., a minimum credit score), etc. With respect to the vehicle, the prequalification criteria may include, but is not limited to, a manufacturer of vehicle, an age of the vehicle, a mileage of the vehicle, price of vehicle, etc.

In some embodiments, one or more applicants may request to submit a prequalification application for a loan to the multi-lender architecture using one of the UIs 101-103. As an example, the user may interface with the buyer UI 101 to obtain pricing information for a loan for an automobile. The buyer UI 101 may present a selection for requesting to getting pre-qualified. In response to the user selecting the request for getting pre-qualified, the buyer UI 101 may receive input associated with personal information of the user (e.g., name, address, asset information, salary, employment information, social security number, and/or the like). In one embodiment, the buyer UI 101 may transmit the encrypted personal information and prequalification request to the multi-lender layer 105, via the Buy/Sell API 106, using Hypertext Transfer Protocol Secure (HTTPS). In some embodiments, the buyer UI 101 may encrypt the personal information and prequalification request and transmit the encrypted personal information and prequalification request to the multi-lender layer 105, via the Buy/Sell API 106. In some embodiments, portions of the personal information may be encrypted by the buyer UI 101, such as the social security number (SSN).

Figure 4:
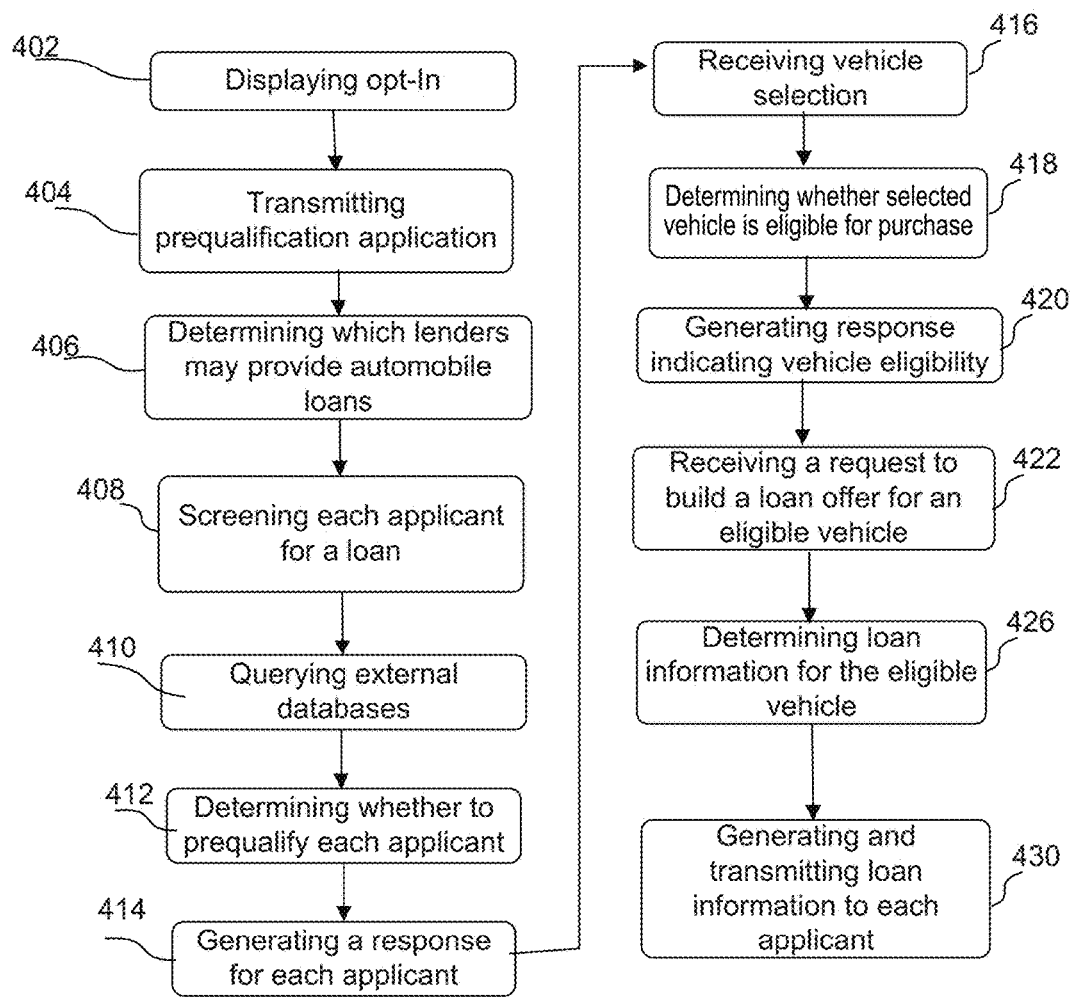
FIG. 4 is an example flow for obtaining pricing information for an automobile loan from a lender using the multi-lender architecture according to an embodiment.

In response to receiving the request, the multi-lender architecture may display an opt-in message to the one or more applicants using a graphical user interface (GUI) of the UIs 101-103 (e.g., FIG. 4, operation 402). The opt-in message enables the applicant(s) to consent to being pre-qualified by the loan origination system 112a, the third-party loan origination system 111a, and/or the vault 108. As a result, the multi-lender layer 105 may determine which ones of the loan origination system 112a, the third-party loan origination system 111a, and/or the vault 108 will be used to prequalify each applicant.

For example, after accepting or declining to opt-in, the API Passthru 107 may transmit the pre-qualification application to the loan origination system 112a, the third-party loan origination system 111a, and/or the vault 108 (e.g., FIG. 4, operation 404). For example, when the one or more applicants approves the opt-in, the prequalification application may be submitted to the loan origination system 112a, the third-party loan origination system 111a, and the vault 108, in parallel. However, when the one or more applicants declines the opt-in, the prequalification application may be submitted to the loan origination system 112a. In such circumstances, the one or more applicants may be limited to an inventory of vehicles that are provided by dealerships having a relationship with the proprietor of the loan origination system 112a.

In some embodiments, for each applicant, the prequalification application may include credentials, such as, but not limited to, an application type (e.g., individual or joint application), identification number (e.g., tax identification number or social security number), full name, date of birth, contact information (e.g., phone number and/or email address), annual gross income, primary employment information (e.g., employer name, job title, months employed), current employment status (full-time, part-time, retired, etc.), employment history, current address, property type (e.g., rent or own), months residing at current residence, and previous address information, including address, type, and/or months residing at previous address(es), employment history, retired, other).

The UIs 101-103 may encrypt the information obtained from the one or more applicants along with a prequalification request and transmit the encrypted applicant information and prequalification request to the multi-lender layer 105 via the Buy/Sell API 106. Alternatively, the Buy/Sell API 106 may encrypt the applicant information and pre-qualification request, and transmit the encrypted applicant information and prequalification request to the multi-lender layer 105 via the API Passthru 107. In some embodiments, the prequalification request may be transmitted in an unencrypted manner to the multi-lender layer 105. In some embodiments, the API Passthru 107 may be an interface between APIs and micro-services (e.g., prequalification micro-service 108a, product eligibility micro-service 108b, and pricing micro-service 108c). The API Passthru 107 may also forward the personal information along with the prequalification request to one or more of the vault 108, third-party loan origination system 111a, or the loan origination system 112a.

In some embodiments, the Buy/Sell API 106 may also provide version control. For example, clients such as the buyer UI 101, seller UI 102, or digital retailer UI 103 may transmit requests to micro-services 108a-c, along with parameters corresponding to the version of the micro-service the client is transmitting the request to. For example, different versions of the micro-services 108a-c may require different parameters to be transmitted along with the request. The Buy/Sell API 106 may determine which version of a micro-service the client is intending to transmit the request, and based on this determination, the Buy/Sell API 106 may format the request and/or parameters to construct the request in a compatible format with the version of the micro-service residing in the multi-lender layer 105.

In response to receiving the applicant information and the prequalification request, in some embodiments, the Buy/Sell API 106 may determine which lenders may provide automobile loans based on the personal information (e.g., FIG. 4, operation 406) and in some cases based on the vehicle as well. For example, the Buy/Sell API 106 may determine a set of lenders that can provide automobile loans based on the personal information provided by the user. The Buy/Sell API 106 can generate a prequalification request for each lender in the set of lenders and transmit each request to the multi-lender layer 105. The Buy/Sell API 106 may generate a call for each generated prequalification request to the prequalification micro-service 108a within the vault 108. The API Passthru 107 may communicate inputs along with calls to the loan origination system 112a, the third-party loan origination system 111a, and/or the prequalification micro-service 108a.

In some embodiments, the loan origination system 112a, the third-party loan origination system 111a, and/or the prequalification micro-service 108a may apply their respective rule sets to the applicant information and prequalification request to screen each applicant for a loan (e.g., FIG. 4, operation 408). For example, the criteria for prequalifying the one or more applicants may include, but is not limited to, salary, geographic location, credit score, driving violation history, accident history, financial asset disclosure (e.g. existing bank accounts), etc. In some embodiments, the loan origination system 112a and/or the third-party loan origination system 111a, may automatically decline the prequalification application based on a minimum threshold criteria. Similarly, for any given lender, the prequalification micro-service 108a may automatically decline the prequalification application based on minimum threshold criteria of the given lender. For example, the prequalification request may be automatically declined in the event that an applicant fails to meet minimum income requirements or length of employment requirements, or the like.

When an applicant is not automatically declined, the loan origination system 112a, the third-party loan origination system 111a, and/or the prequalification micro-service 108a may also query external databases (e.g., FIG. 4, operation 410), such as credit bureaus, a lending terms database, a risk assessment database, an employment confirmation database, as well other data sources to access variables, including each applicant's credit score, employment history, etc. Based on the additional information of each applicant, the loan origination system 112a, the third-party loan origination system 111a, and/or prequalification micro-service 108a may apply further criteria to determine whether the applicant should be prequalified (e.g., does the applicant meet minimum credit score requirements, confirmation of employment/income, etc.) (e.g., FIG. 4, operation 412). For example, the loan origination system 112a, the third-party loan origination system 111a, and/or the prequalification micro-service 108a may populate a prequalification score-sheet to determine whether to prequalify each applicant.

In some embodiments, the prequalification micro-service 108a may apply the criteria of each lender 120 stored in the lender confidential repository 108e to determine whether the one or more applicants is prequalified for the loan, while the loan origination system 112a determines whether the one or more applicants is prequalified based on the requirements stored therein, and the third-party loan origination system 111a determines whether the one or more applicants is prequalified based on the requirements stored therein. In some embodiments, when the personal information and prequalification request are encrypted, the prequalification micro-service 108a may decrypt the encrypted personal information and prequalification request and apply the prequalification criteria associated with each of the plurality of lenders from the lender confidential repository 108e. The prequalification micro-service 108a may process, in parallel, each applicant's prequalification request for each of the plurality of lenders using each applicant's personal information and the prequalification information associated with each respective lender, which may be different for each lender. For example, for each lender, the prequalification micro-service 108a may determine whether the user satisfies each criteria established by the lender, e.g., whether the user meets income requirements, employment requirements, credit scores, etc.

After determining whether the user is prequalified for each lender, the loan origination system 112a, the third-party loan origination system 111a, and/or the prequalification micro-service 108a may generate a response to the applicant (e.g., FIG. 4, operation 414). That is, the loan origination system 112a, the third-party loan origination system 111a, and/or the prequalification micro-service 108a may generate a prequalification output based on the application of the first rule set and the second rule sets to the applicant information and the prequalification request. For example, for each lender, the response may indicate a decision status (e.g., whether the applicant is approved, declined, or referred to another lender), a decision timestamp (e.g., a date when the decision was rendered), an offer expiration timestamp (e.g., when the prequalification will expire), and an application identification number (e.g., a unique ID assigned by the lender for the prequalification offer). In some embodiments, the response may include a prequalification amount.

In some embodiments, the loan origination system 112a, the third-party loan origination system 111a, and/or the vault 108 may encrypt the prequalification results and transmit the encrypted prequalification results to the Buy/Sell API 106 via the API Passthru 107. In some embodiments, the loan origination system 112a, the third-party loan origination system 111a, and/or the vault 108 may transmit unencrypted prequalification results to the Buy/Sell API 106 via the API Passthru 107. When the prequalification results are encrypted, the Buy/Sell API 106 may decrypt the encrypted prequalification results and communicate with any one of the UIs 101-103 to render the decrypted prequalification results to the one or more applicants. In some embodiments, the encrypted prequalification results may be forwarded from the Buy/Sell API 106 to one of the UIs 101-103, which, in turn, may decrypt the prequalification results for display purposes, such that the prequalification results may be segregated by individual user session which may display the prequalification contents specific to the one or more applicants. That is, the prequalification output may be displayed on a device via one of the UIs 101-103. Thus, the one or more applicants may be informed of the lenders that have prequalified the one or more applicants. Example processes and systems for securing output data for each lender are described in U.S. patent application Ser. No. 16/882,274, titled, "SECURING LENDER OUTPUT DATA," filed concurrently herewith, which is incorporated herein by reference in their entirety.

In some embodiments, the prequalification results may be generated in 55 seconds or less. In some embodiments, the prequalification results may be held as valid for a predetermined period of time, e.g., 30 days. In some embodiments, the prequalification process may include defining the prequalification micro-service 108*a* with the criteria required by each lender, integrating with credit bureaus and other data sources to access some of the criteria, and executing the prequalification micro-service 108*a* to render a prequalification decision, while ensuring auditability, retention and other legal requirements. In some embodiments, the prequalification process described herein provides lenders with access to credit variables without impacting the credit of the one or more applicants as the process is designed to ensure that there is no reporting impact to credit of the one or more applicants if any variables are accessed from credit reports. Additionally, in some embodiments, the data used for the prequalification process and the results thereof may be audited in real time and made available for validation by lenders. Furthermore, the prequalification process ensures latency and scalability requirements are uniformly met for all lenders, addressing anti-competitive and antitrust issues, while enabling greater choice for consumers.

In some embodiments, the response may also include an approval status (e.g., was the application approved as submitted, was the application counter offered, a pending structure of the offer, a payment call, etc.), stipulation details of the offer (e.g., proof of income, proof of residency, proof of length of employment, etc.), lender comments (e.g., a comment, reminder, or instructional note that the lender wants to convey to applicant), an application timestamp (e.g., a date the application was received), an offer update timestamp (e.g., a timestamp the application offer was last updated), analyst information (e.g., information of a lender representative who will be working on the application offer, such as a name, business title, email address, phone number, phone extension, and/or fax number), and/or error details of the application (e.g., an error code, an error description, error documentation, and/or a link to more information about the error).

After the prequalification results are displayed to the one or more applicants on one of the UIs 101-103, the one or more applicants may select a vehicle for purchase. That is, subsequent to the prequalification results being rendered on the GUI of one of the UIs 101-103, the one of the UIs 101-103 may receive a selection of a vehicle intended for purchase from the one or more applicants. The one of the UIs 101-103 may encrypt the information associated with the selected vehicle (e.g., make, model, mileage, year, dealership, and/or the like) and transmit the encrypted information associated with the selected vehicle to multi-lender layer 105 (e.g., FIG. 4, operation 416). For example, the information associated with the selected vehicle may be transmitted to the multi-lender layer 105 via the Buy/Sell API 106. For example, the Buy/Sell API 106 may generate a call to the product eligibility micro-service 108*b* for each lender the user is prequalified for the automobile loan (i.e., each lender included in the prequalification results). In some embodiments, the Buy/Sell API 106 may encrypt the information associated with the selected vehicle and transmit the encrypted information associated with the selected vehicle to the API Passthru 107, which may then forward the encrypted information associated with the selected vehicle to the loan origination system 112*a*, the third-party loan origination system 111*a*, and/or the vault 108. In some embodiments, the information associated with the selected vehicle may be transmitted in an unencrypted manner. When the information associated with the selected vehicle is encrypted, the loan origination system 112*a*, the third-party loan origination system 111*a*, and/or the vault 108 may decrypt the encrypted information associated with the selected vehicle.

The API Passthru 107 may communicate each call to the product eligibility micro-service 108*b* for each lender the user is prequalified for the automobile loan and the information associated with the selected vehicle to the vault 108. In some embodiments, the product eligibility micro-service 108*b* may retrieve vehicle eligibility information associated with the lenders included in the prequalification results from the lender confidential information repository 108*e* and determine, in parallel for each lender that prequalified the one or more applicants, whether the selected vehicle is eligible for an automobile loan (e.g., FIG. 4, operation 418). For example, for each lender, the product eligibility micro-service 108*b* may determine whether the selected vehicle satisfies the eligibility criteria established by each respective lender, which may be different for each lender, as discussed herein. For example, each lender may have different requirements for make, model, year, mileage, price, and/or the like. In this regard, the product eligibility micro-service 108*b* may determine that certain vehicles are not eligible for automobile loans from given lenders. Likewise, the loan origination system 112*a* may determine vehicle eligibility based on the requirements stored therein.

In some embodiments, the loan origination system 112*a*, the third-party loan origination system 111*a*, and/or the product eligibility micro-service 108*b* may generate a vehicle eligibility result (e.g., FIG. 4, operation 420). While some lenders may prequalify the one or more applicants for a loan, the selected vehicle may not satisfy the vehicle eligibility requirements of a given lender. As such, in some embodiments, the product eligibility micro-service 108*b* may generate vehicle eligibility results indicating which lenders from the lenders that prequalified the one or more applicants are offering a loan for the selected vehicle. The vault 108 may encrypt the vehicle eligibility results and transmit the encrypted vehicle eligibility results through the API Passthru 107 to the Buy/Sell API 106. In some embodiments, the Buy/Sell API 106 may decrypt the vehicle eligibility results and communicate with one of the UIs 101-103 to display the decrypted vehicle eligibility results to the one or more applicants. In some embodiments, the Buy/Sell API 106 forward the encrypted vehicle eligibility results to one of the UIs 101-103, which may then decrypt the vehicle eligibility results and display the decrypted vehicle eligibility results to the one or more applicants. In some embodiments, the vault 108 may transmit unencrypted vehicle eligibility results to one of the UIs 101-103 through the API Passthru 107 and Buy/Sell API 106. Likewise, the loan origination system 112a and/or the third party loan origination system 111a may indicate whether or not the selected vehicle is eligible for financing. That is, in some embodiments, the API Passthru 107 may forward the product eligibility results to the Buy/Sell API 106, and in turn, the Buy/Sell API 106 may render the product eligibility results on the buyer UI 101 GUI.

In some embodiments, for prequalifying the one or more applicants and determining vehicle eligibility, rules from the lenders 120 may combine attributes using, for example, Boolean logic such as AND, OR, XOR, to form conditions. In addition, in some embodiments, the rules from the lenders 120 may include machine learning logic including support vector machines (SVM), random-forest techniques, decision-trees, etc., which may be used for classifying the one or more applicants, eligible vehicles, or both, in different groups. In some embodiments, as the applicant pool and vehicle pool grows, the applicant and vehicle data sets, or any subsets therein, may be used to train machine-learning classifiers, which may then be used to classify the data into groups of applicants or groups of vehicles by the prequalification micro-service 108a and the product eligibility micro-service 108b, and subsequently used by the pricing micro-service 108c. Resampling procedures including K-fold cross-validation may be used as well for higher accuracy in training datasets.

After the vehicle eligibility results are displayed to the one or more applicants, the UIs 101-103 may be used to submit a request to the loan origination system 112a, the third-party loan origination system 111a, and/or the pricing micro-service 108c to build a loan offer for the selected vehicle from the one or more applicants (e.g., FIG. 4, operation 422). The request may include information including, but not limited to, each applicant's identification number (e.g., tax identification number or social security number), the application identification number generated during prequalification, vehicle details (e.g., vehicle identification number (VIN), year, make, model, mileage, vehicle location, or the like), trade-in details (e.g., year, make, model, vehicle valuation amount, remaining balance, or the like), deal structure (e.g., loan term, sales price, trade-in value (i.e., positive or negative equity in the trade-in), down payment, or the like), finance product details (e.g., product type (e.g., GAP, service contract, or the like), purchase amount, etc.), and/or fee details (e.g., taxes, title, and license (TTL) fees, dealer fees, etc.).

In some embodiments, the UIs 101-103 may encrypt the information associated with the request for building an offer and transmit the information associated with the request for building an offer to the multi-lender layer 105 via the Buy/Sell API 106. In some embodiments, the UIs 101-103 or the Buy/Sell API may encrypt (e.g., tokenize) each applicant's identification number with the remaining information being unencrypted. In some embodiments, the Buy/Sell API 106 may encrypt the information associated with the request for building an offer and transmit the encrypted information associated with the request for building an offer to the multi-lender layer 105, e.g., at the API Passthru 107. The Buy/Sell API 106 may determine that user is eligible for a loan from one or more lenders, based on the prequalification results and the product eligibility results. The Buy/Sell API 106 can generate pricing offer requests for each of the one or more lenders and transmit the requests to the multi-lender layer 105. The Buy/Sell API may generate a call to the pricing micro-service 108c, for each generated pricing offer requests.

After receiving the information associated with the request for building an offer, the API Passthru 107 may forward the information to the loan origination system 112a, the third party loan origination system 111a, and/or the vault 108, which may each decrypt the encrypted information. For example, the API Passthru 107 may communicate each call to the pricing micro-service 108c. Using this information, the loan origination system 112a, the third party loan origination system 111a, and/or the vault 108 may apply one or more rule sets to the applicant information and the vehicle information to determine a price for the eligible vehicle (e.g., FIG. 4, operation 424). For example, in some embodiments, after decrypting the information, the pricing micro-service 108c may retrieve pricing information associated with the lenders included in the prequalification results and vehicle eligibility results based on information stored in the lender confidential repository 108e. The pricing information may include use Bayesian regression algorithms, decision trees, pricing girds, or various equations to determine pricing for a loan offer. The pricing information may also provide sources for retrieving certain information. For example, a lender may need to use the prequalification results and/or product eligibility results. The lender may indicate to the pricing micro-service 108c to retrieve the prequalification results and/or product eligibility results. Alternatively, or in addition to, the pricing information may include instructions to retrieve information from third party vendors. Accordingly, the pricing micro-service 108c may retrieve the information from the third party vendors.

Using this information, the pricing micro-service 108c may process and build, in parallel, a loan offer based on the information associated with the request for building an offer, information associated with the selected vehicle, information associated with each of the one or more applicants, and information associated with pricing for each of the respective lenders, which may be different for each lender. For example, each lender may offer different interest rates based on the information associated with the request for building an offer, information associated with the selected vehicle and information associated with the user.

Thus, in some embodiments, using the results from the prequalification micro-service 108a and the product eligibility micro-service 108b, the pricing micro-service 108c may use lender-specific information such as pricing grids, matrix-based manipulation, lender-specific mathematical formulas, etc., to combine the applicant based attributes and the product based attributes, as described above, to determine financing terms such as APR's, maximum amount that an applicant may borrow, length of financing, among other terms. In some embodiments, the vault 108 may encrypt these terms and transmit them to the buyer UI 101, through the API Passthru 107 and the Buy/Sell API 106.

For example, each lender may offer a base interest rate that changes based on user information, a different interest rate based on the make/model/year/mileage of the vehicle, or a different interest based on the credit score of each applicant. In some embodiments, the pricing micro-service 108c may also communicate with one or more third-party systems to obtain data indicating a book value of the selected vehicle. Additionally, each lender may use a different methodology for calculating pricing for a loan offer. For example, lenders may use Bayesian regression algorithms, decision trees, or various equations to determine pricing for a loan offer. Each of the methodologies for the respective lenders may be stored in the lender confidential repository 108e. Likewise, the loan origination system 112a may build its own respective loan based on its requirements. In some embodiments, the pricing for a vehicle may be generated in under 10 seconds.

In some embodiments, the loan origination system 112a, the third party loan origination system 111a, and/or the pricing micro-service 108c may each generate respective pricing responses (e.g., FIG. 4, operation 426). That is, in some embodiments, the loan origination system 112a, the third party loan origination system 111a, and/or the vault 108 may generate a purchase output based on the application of the first rule set and the second rule sets to the applicant information and the vehicle information. The pricing responses may include an amount to finance (e.g., approved amount to finance), a monthly payment amount (e.g., the monthly installment payment), annual percentage rate (APR) (e.g., the rate at which the lender will finance the loan), and/or terms and conditions of the loan. In some embodiments, the pricing response may also include counteroffer details (e.g., counteroffers on, for example, down payment, sales price, a trade-in value, etc.), whether a maximum value was exceeded or a minimum value was not met, as well as difference between the maximum/minimum value and the amount of the loan), stipulation details (e.g., conditions required by the lender), lender comments (e.g., a comment, reminder, or instructional note that the lender wants to convey to applicant), and/or error details (e.g., an error code, an error description, error documentation, and/or a link to more information about the error).

In some embodiments, the loan origination system 112a, the third party loan origination system 111a, and/or the vault 108 may encrypt the pricing responses and transmit the encrypted pricing responses through the API Passthru 107 to the Buy/Sell API 106, which may decrypt the encrypted pricing responses and communicate with the UIs 101-103 to render the pricing responses on the client devices executing the UIs 101-103. Alternatively, the Buy/Sell API 106 may forward the encrypted pricing responses to the UIs 101-103, such that the client devices may decrypt the pricing responses and display the results to the one or more applicants. In some embodiments, the pricing responses may be sent to the UIs 101-103 in an unencrypted manner. That is, the purchase amount may be displayed on a device using one of the UIs 101-103.

Using the pricing responses from each of the lenders, the one or more applicants may then complete the transaction for purchasing the selected vehicle. Thus, in some embodiments, the pricing process described herein include defining pricing rules for each lender, executing the pricing rules on eligible vehicles, and returning the resulting pricing for each lender, while ensuring auditability, retention and other legal requirements. Lenders have unique pricing rule structures, rules, requirements for frequency of changes to pricing rules, and requirements for duration of validity of offers, and the systems and methods described herein provide for flexibility in ensuring that these factors are satisfied for each lender by enabling lenders to apply specific pricing rules and policies in real time. Furthermore, this enables customers to obtain a specific price and payment info customized for their credit situation.

Figure 3:
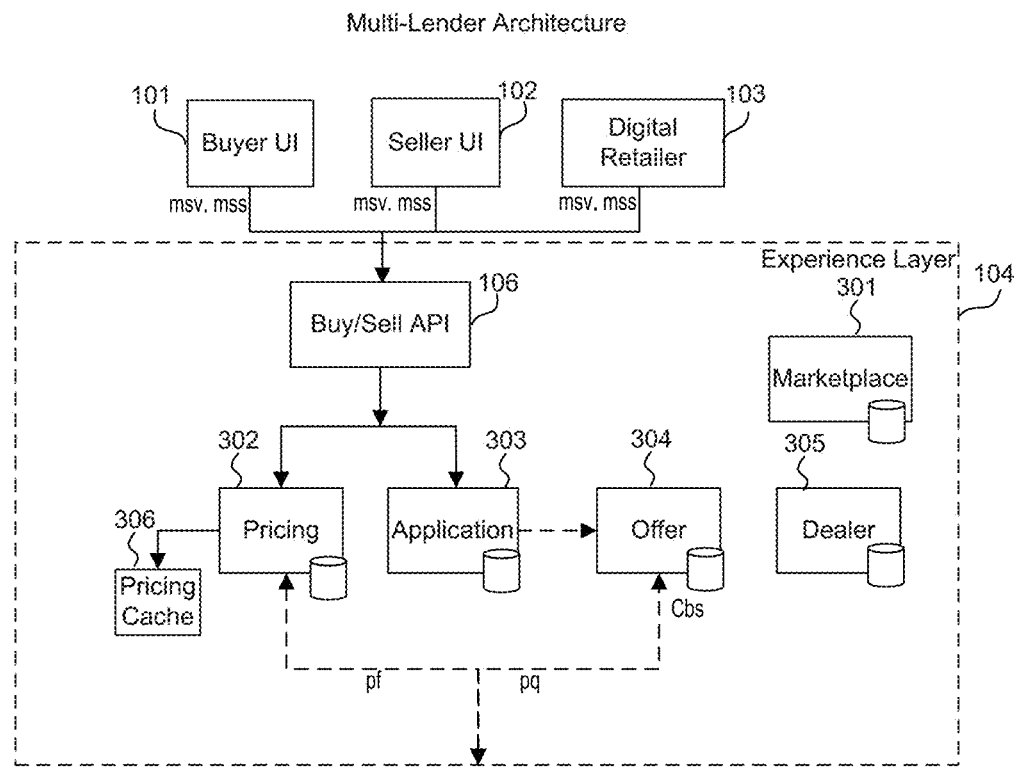
FIG. 3 is a block diagram illustrating an expanded view of the Buy/Sell API in accordance to an embodiment.

FIG. 3 is a block diagram illustrating an expanded view of the Buy/Sell API 106 in accordance with embodiments of the present disclosure. As described above with respect to FIGS. 1-2, the Buy/Sell API 106 may reside in the experience layer 104 of the multi-lender architecture. The Buy/Sell API 106 may be used to interface between clients such as buyer UI 101, seller UI 102, and digital retailer UI 103, and the multi-lender layer 105. As illustrated in FIG. 3, the experience layer 104 may include a marketplace repository 301, pricing repository 302, an application repository 303, an offer repository 304, a dealer repository 305, and a pricing cache 306. In some embodiments, the experience layer 104 may use the marketplace repository 301, pricing repository 302, application repository 303, offer repository 304, dealer repository 305, and pricing cache 306 to provide consistent and reliable pricing information to the one or more applicants by storing the pricing, prequalification, and applications submitted by a user for a specified period of time.

For example, in some embodiments, the marketplace repository 301 may store information associated with lenders and products. The information stored in the marketplace repository 301 may be updated in real-time. For example, the one or more applicants may apply for a loan for a product, and the Buy/Sell API 106 may filter out lenders from the marketplace which may not provide loans for the product based on the personal information of the one or more applicants or the product itself. Additionally, as the application for the loan is processed, each time a lender rejects or approves the loan, the marketplace repository 301 may be updated. Furthermore, based on the lenders for which the loans are being processed, the Buy/Sell API 106 can filter out the ineligible products from the marketplace repository 301 which may not be eligible for a loan. In some embodiments, an applicant intending to purchase an automobile may interface with buyer UI 101. The user may receive prequalification results as described above with respect to FIGS. 1-2. Buyer UI 101 may receive input associated with a request to search for automobiles for sale. Buyer UI 101 may search the marketplace repository 301 to search for automobiles for sale in response to receiving the request.

In some embodiments, the pricing repository 302 may store pricing information such as prequalification information or pricing offer information provided by lenders to the one or more applicants. The pricing information may include APR information offered by lenders to a given applicant. The pricing information may be associated with an expiration date. After the expiration date, the pricing information may be in invalid. In some embodiments, when the pricing information is within the expiration date, a given lender 120 may be enforced to honor the same pricing information to the one or more applicants at a later date that occurs before the expiration date. In some embodiments, the pricing cache may be a temporary buffer to store pricing information for a short period of time, such as a user session in Buyer UI 101 or Seller UI 102.

In some embodiments, the application repository 303 may store applications for an automobile loan submitted by the one or more applicants for a specified time period. The offers repository 304 may store information associated with offers provided by lenders 120 to the one or more applicants. The offers may be associated with an expiration date. After the expiration date, the offer may be in invalid. In some embodiments, when the offer is within the expiration date, the lender 120 may be enforced to honor the same offer to a user at a later date that occurs before the expiration date. The applications of the user may be communicated from the application repository 303 to the offers repository 304. In some embodiments, the Buy/Sell API 106 may store the application in the application repository 303 and the offer in the offers repository 304, where both repositories 303 and 304 are segregated by user session for different users. In some embodiments, the dealer repository 305 may include information associated with different dealers. For example, seller UI 102 may communicate with the dealer repository 305 to retrieve dealer specific information from the dealer repository 305. The dealer specific information may include dealer requirements for purchasing automobiles, partnerships with lenders and vendors, dealer inventory, and/or the like.

In some embodiments, the micro-services inside the vault (e.g., micro-services 108a-108c of the vault 108) may query the pricing repository 302, applications repository 303, and/or offers repository 304. As an example, a lender may include instructions to use prequalification results and product eligibility results to build a loan offer, and the pricing micro-service 108c may query the pricing repository 302 to retrieve prequalification information for generating an offer for a lender.

As illustrated in FIG. 2, the multi-lender layer 105 may also include an analytic aggregator 202. The analytic aggregator may be embodied as a micro-service residing in the vault 108. The analytic aggregator 202 may capture all of the data generated in the vault 108 for each user (e.g., prequalification results, product eligibility results, and offers) for each lender and store the captured data in encrypted logs 108d. The captured data may be encrypted in a format specific to a given lender, such that, a lender may only decrypt data from the encrypted logs 108d. A lender may download data logs from the encrypted logs 108d specific to the lender itself. In some embodiments, the encrypted logs 108d may track results from the different micro-services 1018a-c for a particular lender 120. Alternatively, the vault 108 may not contain any lender-specific information, and may instead contain metric-based information for system enhancement, such as volume of applications being processed in a predetermined period of time, making a record of any errors encountered in executing the different components of the multi-lender architecture, etc. The vault 108 may also include an audit repository 204 that may store details of the lender-specific rules that were executed, what data looked like as it went through the experience layer 104 and/or the multi-lender layer 105, to demonstrate to an independent auditor that the data is not being changed or altered in any way as it traverses through the different components of the multi-lender architecture.

In some embodiments, the one or more applicants may receive offers for automobile loans for a specified vehicle from various lenders using the buyer UI 101, as described herein. In some embodiments, the one or more applicants may attempt to purchase the vehicle at the intended dealership at a later date. The one or more applicants may retrieve the same offers generated in buyer UI 101 using the seller UI 102 within a specified period of time. For example, the offers may be stored in the offers repository 304, and the seller UI 102 may communicate with the offers repository 304 to retrieve the offers generated for the one or more applicants, while the user was using the buyer UI 101. In some embodiments, the lender 120 may also retrieve the pricing information, applications, and offers provided by the respective lender 120 to the user at a later date. Thus, the one or more applicants may be guaranteed that the offers generated in one UI is valid even when using a different UI at a later date so that the user is provided with consistent pricing and scoring.

FIG. 5 is a block diagram of an example environment 500 in which systems and/or methods described herein may be implemented. The environment 500 may include a user device 501, a dealer device 502, and a lender device 503, a backend platform 515, a cloud computing environment 520, and a network 530. The devices of the environment 500 may be connected through wired connections, wireless connections, or a combination of wired and wireless connections.

In some embodiments, one or more portions of the network 530 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 515 may include one or more devices configured to host the multi-lender architecture (e.g., multi-lender architecture 100 as shown in FIGS. 1-2). The backend platform 515 may include a server or a group of servers. In some embodiments, the backend platform 515 may be hosted in a cloud computing environment 520. It may be appreciated that the backend platform 515 may not be cloud-based, or may be partially cloud-based.

The user device 501, dealer device 502, and lender device 503 may include one or more devices configured to interface with the backend platform 515. The user device 501 may include an buyer UI 511, the dealer device 502 may include a seller UI 512 application, and the lender device 503 may include a lender portal 509. The buyer UI 511 and the seller UI 512 application may be, for example, the respective UIs described with respect to FIGS. 1-2, and may be used by users to receive loan offers for vehicles that are intended to be purchased. The lender portal 519 may be, for example, the lender portal 109 described with respect to FIG. 1, and may be used to access the multi-lender layer (e.g., multi-lender layer 105 as shown in FIG. 1) so that lenders may upload information associated with prequalification, product eligibility, and pricing, to the vault (e.g., the vault 108 as shown in FIG. 1). Each of the user device 501, dealer device 502, and lender device 503 may include a display configured to display GUI 506, 510, and 514, respectively.

In some embodiments, a digital retailer UI 103 can be a web domain configured to access the backend platform 515 using a hyperlink. The user device 501, dealer device 502, or lender device 503 can access the web domain using a web browser.

In some embodiments, the seller UI 512 application can communicate with the user device 501. As an example, the seller UI 512 can transmit a link to the user device 501 to initiate a prequalification request as described with respect to FIGS. 1-2.

The cloud computing environment 520 includes an environment that delivers computing as a service, whereby shared resources, services, etc. may be provided to the device 100 and/or the backend platform 515. The cloud computing environment 520 may provide computation, software, data access, storage, and/or other services that do not require end-user knowledge of a physical location and configuration of a system and/or a device that delivers the services. The cloud computing system 520 may include computer resources 522.

Each computing resource 522 includes one or more personal computers, workstations, computers, server devices, or other types of computation and/or communication devices. The computing resource(s) 522 may host the backend platform 515. The cloud resources may include compute instances executing in the computing resources 522. The computing resources 522 may communicate with other computing resources 522 via wired connections, wireless connections, or a combination of wired or wireless connections.

Computing resources 522 may include a group of cloud resources, such as one or more applications ("APPs") 523-1, one or more virtual machines ("VMs") 523-2, virtualized storage ("VS") 523-3, and one or more hypervisors ("HYPs") 523-4.

Application 523-1 may include one or more software applications that may be provided to or accessed by the user device 501, dealer device 502 and the lender device 503. In some embodiments, the application 504 may execute locally on the user device 501, dealer device 502 and the lender device 503. Alternatively, the application 523-1 may eliminate a need to install and execute software applications on the user device 501, dealer device 502 and the lender device 503. The application 523-1 may include software associated with backend platform 515 and/or any other software configured to be provided across the cloud computing environment 520. The application 523-1 may send/receive information from one or more other applications 523-1, via the virtual machine 222-2.

Virtual machine 523-2 may include a software implementation of a machine (e.g., a computer) that executes programs like a physical machine. Virtual machine 523-2 may be either a system virtual machine or a process virtual machine, depending upon the use and degree of correspondence to any real machine by virtual machine 523-2. A system virtual machine may provide a complete system platform that supports execution of a complete operating system (OS). A process virtual machine may execute a single program and may support a single process. The virtual machine 523-2 may execute on behalf of a user (e.g., the user device 501, dealer device 502 and the lender device 503) and/or on behalf of one or more other backend platforms 515, and may manage infrastructure of cloud computing environment 520, such as data management, synchronization, or long duration data transfers.

Virtualized storage 523-3 may include one or more storage systems and/or one or more devices that use virtualization techniques within the storage systems or devices of computing resource 522. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 523-4 may provide hardware virtualization techniques that allow multiple operations systems (e.g., "guest operating systems") to execute concurrently on a host computer, such as computing resource 522. Hypervisor 523-4 may present a virtual operating platform to the guest operating systems, and may manage the execution of the guest operating systems multiple instances of a variety of operating systems and may share virtualized hardware resources.

Figure 6:
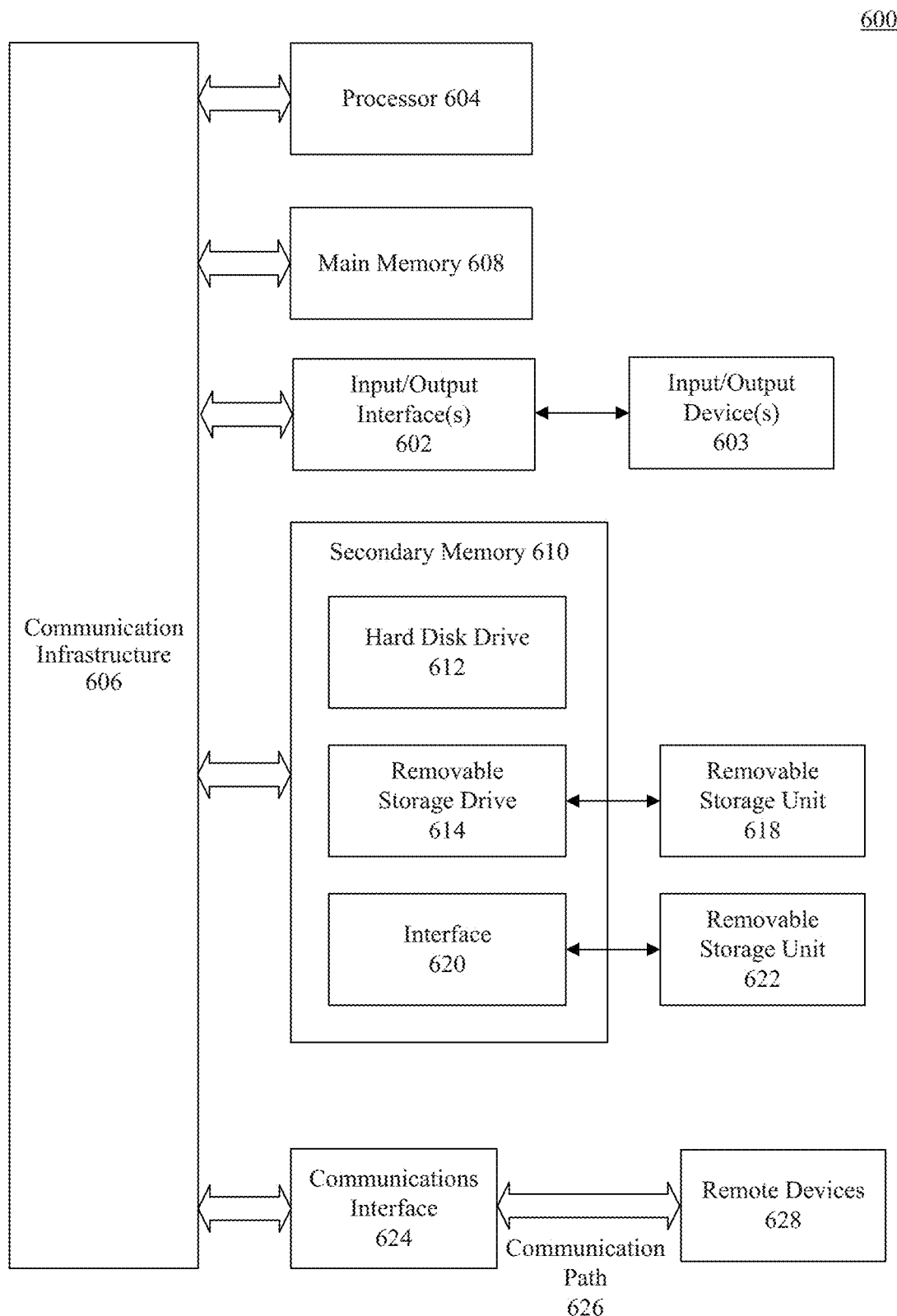
FIG. 6 is a block diagram of example components of a computing system according to an embodiment.

Various embodiments can be implemented, for example, using one or more well-known computer systems, such as computer system 600 shown in FIG. 6. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606. Processor 604 may be a graphics processing unit (GPU). In some embodiments, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Embodiments of the present embodiments have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

The foregoing description of the specific embodiments will so fully reveal the general nature of the embodiments that others may, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described exemplary embodiments, but should be defined only in accordance with the following claims and their equivalents.

What is claimed is:

1. A method for securely storing proprietary information and prequalifying an applicant for purchase of a good using a multi-lender architecture, the multi-lender architecture comprising a backend platform for implementing the multi-lender architecture, the method comprising:

receiving, by one or more computing devices and via a client application executing on a client device, a request to pre-qualify the applicant for the purchase of the good, and applicant information used to determine whether to pre-qualify the applicant;

receiving, by the one or more computing devices and from a plurality of lenders via a lender portal, proprietary information and one or more rule sets for each lender from the plurality of lenders, wherein the proprietary information and the one or more rule sets are used to determine whether to pre-qualify the applicant;

storing, by the one or more computing devices, the proprietary information and the one or more rule sets in a lender confidential data repository, wherein the lender confidential data repository is part of a jailed and non-accessible environment of the backend platform such that the proprietary information and the one or more rule sets of each lender may not be accessed or viewed by other lenders;

determining, by the one or more computing devices, to which of a plurality of interactive micro-services to transmit the request and the applicant information, wherein the plurality of interactive micro-services are part of the jailed and non-accessible environment of the backend platform, wherein the plurality of interactive micro-services apply the one or more rules sets to determine whether to pre-qualify the applicant;

transmitting, by the one or more computing devices and based on determining which of the plurality of interactive micro-services to transmit the request to via an application programming interface (API), the request and the applicant information to each interactive micro-service from the plurality of interactive micro-services;

applying, by the one or more computing devices and using each interactive micro-service from the plurality of interactive micro-services to which the request and the applicant information were transmitted, the one or more rule sets for each of the plurality of lenders in parallel to the applicant information to determine whether to pre-qualify the applicant;

generating, by the one or more computing devices and using each interactive micro-service, an encrypted pre-qualification output based on applying the one or more rule sets to the applicant information;

transmitting, by the one or more computing devices, the encrypted prequalification output to the API, the API being further configured to decrypt the encrypted prequalification output for a single user session on the client application; and transmitting, by the one or more computing devices, the decrypted prequalification output to the client device for displaying the decrypted prequalification output on the client device.

2. The method of claim 1, wherein the receiving the applicant information comprises receiving encrypted applicant information.

3. The method of claim 1, further comprising:
in response to receiving the request to pre-qualify the applicant,
displaying, using a graphical user interface (GUI), an opt-in message to the applicant via the client application, and
applying, by the one or more computing devices, the one or more rule sets to the applicant information in response to the applicant approving the opt-in.

4. The method of claim 3, wherein, in response to the applicant approving the opt-in message, assessing, by the one or more computing devices, prequalification eligibility for the applicant based on one or more threshold criteria of each lender as defined in the one or more rule sets.

5. The method of claim 4, wherein, in response to the applicant failing the one or more threshold criteria, automatically declining, by the one or more computing devices, the request to pre-qualify the applicant.

6. A multi-lender architecture for securely storing proprietary information and pre-qualifying an applicant for a purchase of a good, the multi-lender architecture comprising a backend platform for implementing the multi-lender architecture, wherein the backend platform is configured to:
receive, by one or more computing devices and via a client application executing on a client device, a request to pre-qualify the applicant for the purchase of the good, and applicant information used to determine whether to pre-qualify the applicant;
receive, by the one or more computing devices and from a plurality of lenders via a lender portal, proprietary information and one or more rule sets for each lender from the plurality of lenders, wherein the proprietary information and the one or more rule sets are used to determine whether to pre-qualify the applicant;
store, by the one or more computing devices, the proprietary information and the one or more rule sets in a lender confidential data repository, wherein the lender confidential data repository is part of a jailed and non-accessible environment of the backend platform such that the proprietary information and the one or more rule sets of each lender may not be accessed or viewed by other lenders;
determine, by the one or more computing devices, to which of a plurality of interactive micro-services to transmit the request and the applicant information, wherein the plurality of interactive micro-services are part of the jailed and non-accessible environment of the backend platform, wherein the plurality of interactive micro-services apply the one or more rules sets to determine whether to pre-qualify the applicant;
transmit, by the one or more computing devices and based on determining which of the plurality of interactive micro-services to transmit to via an application programming interface (API), the request and the applicant information to each interactive micro-service from the plurality of interactive micro-services;
apply, by the one or more computing devices and using each interactive micro-service from the plurality of interactive micro-services to which the request and the applicant information were transmitted, the one or more rule sets for each of the plurality of lenders in parallel to the applicant information to determine whether to pre-qualify the applicant;
generate, by the one or more computing devices and using each interactive micro-service, an encrypted prequalification output based on applying the one or more rule sets to the applicant information;
transmit, by the one or more computing devices, the encrypted prequalification output to the API, the API being further configured to decrypt the encrypted prequalification output for a single user session on the client application; and
transmit, by the one or more computing devices, the decrypted prequalification output to the client device for displaying the decrypted prequalification output on the client device.

7. The backend platform of claim 6, wherein the applicant information comprises encrypted applicant information.

8. The backend platform of claim 6, further configured to:
in response to receiving the request to pre-qualify the applicant,
display, using a graphical user interface (GUI), an opt-in message to the applicant via the client application, and
apply, by the one or more computing devices, the one or more rule sets to the applicant information in response to the applicant approving the opt-in message.

9. The backend platform of claim 8, further configured to, in response to the applicant approving the opt-in message,
assess, by the one or more computing devices, prequalification eligibility based on one or more threshold criteria of each lender as defined in the one or more rule sets.

10. The backend platform of claim 9, further configured to, in response to the applicant failing the one or more threshold criteria,
automatically decline, by the one or more computing devices, the prequalification request.

11. A non-transitory computer readable medium storing instructions for securely storing proprietary information and pre-qualifying an applicant for a purchase of a good using a multi-lender architecture implemented by a backend platform that, when executed by a processor, cause the processor to perform operations comprising:
receiving, by one or more computing devices and via a client application executing on a client device, a request to pre-qualify the applicant for the purchase of the good, and applicant information used to determine whether to pre-qualify the applicant;
receiving, by the one or more computing devices and from a plurality of lenders via a lender portal, proprietary information and one or more rule sets for each lender from the plurality of lenders, wherein the proprietary information and the one or more rule sets are used to determine whether to pre-qualify the applicant;
storing, by the one or more computing devices, the proprietary information and the one or more rule sets in a lender confidential data repository, wherein the lender confidential data repository is part of a jailed and non-accessible environment of the backend platform such that the proprietary information and the one or more rule sets of each lender may not be accessed or viewed by other lenders;

determining, by the one or more computing devices, to which of a plurality of interactive micro- services to transmit the request and the applicant information, wherein the plurality of interactive micro-services are part of the jailed and non-accessible environment of the backend platform, wherein the plurality of interactive micro-services apply the one or more rules sets to determine whether to pre-qualify the applicant;

transmitting, by the one or more computing devices and based on determining which of the plurality of interactive micro-services to transmit the request to via an application programming interface (API), the request and the applicant information to each interactive micro-service from the plurality of interactive micro-services;

applying, by the one or more computing devices and using each interactive micro-service from the plurality of interactive micro-services to which the request and the applicant information were transmitted, the one or more rule sets for each of the plurality of lenders in parallel to the applicant information to determine whether to pre-qualify the applicant;

generating, by the one or more computing devices and using each interactive micro-service, an encrypted pre-qualification output based on applying the one or more rule sets to the applicant information;

transmitting, by the one or more computing devices, the encrypted prequalification output to the API, the API being further configured to decrypt the encrypted pre-qualification output for a single user session on the client application; and transmitting, by the one or more computing devices, the decrypted prequalification output to the client device for displaying the decrypted prequalification output on the client device.

12. The non-transitory computer readable medium of claim 11, wherein the operations further comprise:
in response to receiving the request to pre-qualify the applicant,
displaying, using a graphical user interface (GUI), an opt-in message to the applicant via the client application, and
applying, by the one or more computing devices, the one or more rules sets in response to the applicant approving the opt-in.

13. The non-transitory computer readable medium of claim 12, wherein the operations further comprise, in response to the applicant approving the opt-in message, assessing, by the one or more computing devices, prequalification eligibility for the applicant based on one or more threshold criteria of each lender as defined in the one or more rule sets.

14. The non-transitory computer readable medium of claim 13, wherein the operations further comprise, in response to the applicant failing the one or more threshold criteria, automatically declining, by the one or more computing devices, the request to pre-qualify the applicant.

15. The method of claim 1, further comprising:
decrypting, by the one or more computing devices and using the plurality of interactive micro-services, the one or more rule sets; and
applying, by the one or more computing devices, the one or more rule sets for each lender to the applicant information to determine whether to pre-qualify the applicant.

16. The backend system of claim 6, further configured to:
decrypt, by the one or more computing devices and using the plurality of interactive micro-services, the one or more rule sets; and
apply, by the one or more computing devices, the decrypted one or more rule sets for each lender to the applicant information to determine whether to pre-qualify the applicant.

17. The non-transitory computer readable medium of claim 11, wherein the instructions operations further comprise:
decrypting, by the one or more computing devices and using the plurality of interactive micro-services, the one or more rule sets; and
applying, by the one or more computing devices, the decrypted one or more rule sets for each lender to the applicant information to determine whether to pre-qualify the applicant.

18. The method of claim 1, wherein the method is performed by the backend platform hosted in a cloud computing environment.

19. The backend platform of claim 6, wherein the backend platform is hosted in a cloud computing environment.

20. The non-transitory computer readable medium of claim 11, wherein the backend platform is hosted in a cloud computing environment.

* * * * *